Aug. 29, 1933.    G. BERNERT    1,924,675
PNEUMATIC CONVEYER
Filed May 8, 1931
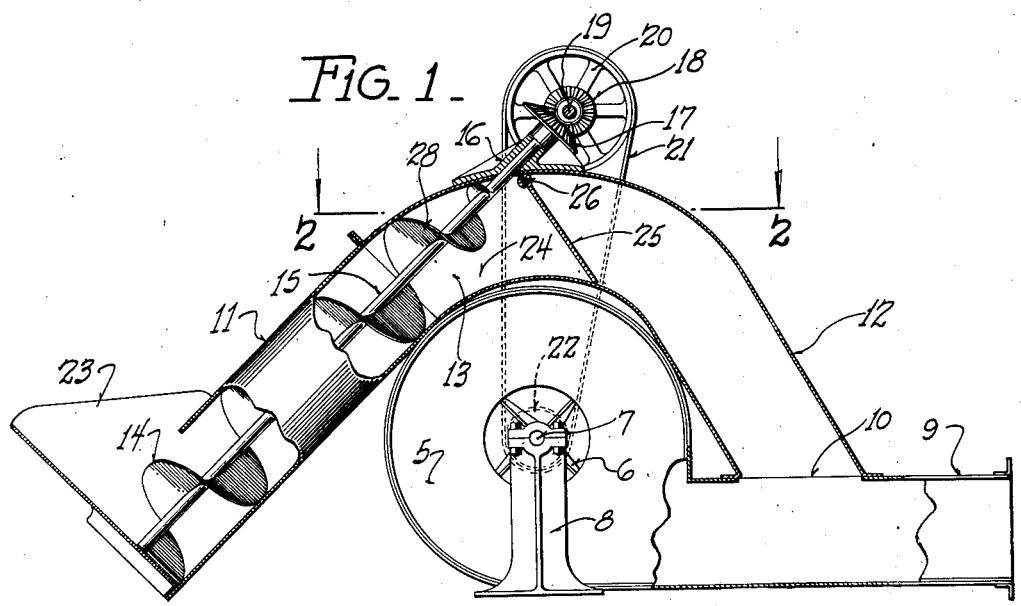
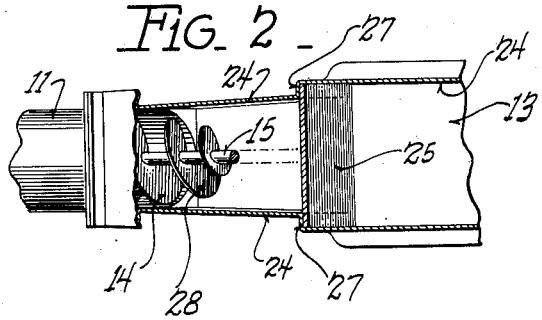
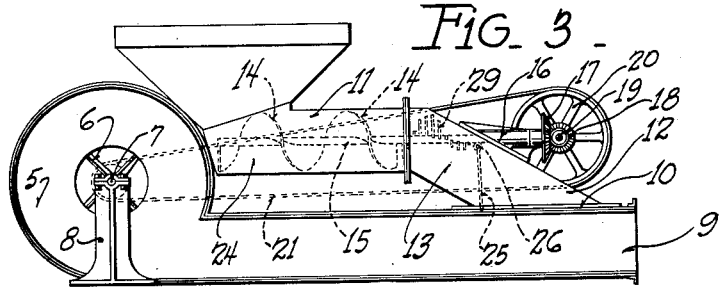
INVENTOR
_George Bernert_
BY Ira Milton Jones
ATTORNEY Patented Aug. 29, 1933

1,924,675

UNITED STATES PATENT OFFICE 1,924,675

PNEUMATIC CONVEYER

George Bernert, Milwaukee, Wis.

Application May 8, 1931. Serial No. 535,998

5 Claims. (Cl. 302—50)

This application is a continuation in part of the one filed October 7, 1926, Serial No. 140,037, and the invention relates to certain new and useful improvement in pneumatic conveyers, and refers more particularly to a conveyer of that type having a conveying air-duct and a conveyer casing communicating therewith and housing mechanical means for conveying the material to be handled therethrough to the air-duct through which it is carried by the conveying current of air therein.

One of the drawbacks to pneumatic conveyers is the back pressure which must be contended with in the mechanical conveyer casing by reason of its communication with the air-duct, and this invention has as one of its objects the provision of an improved structure wherein a positive operating valve member is provided which opens directly in proportion to the volume of material entering the air-duct from the mechanical conveyer casing.

Another object of this invention resides in the provision of a pneumatic conveyer having a screw-type mechanical conveyer for conveying the material from a hopper to the conveying air-duct, the mechanical conveyer casing of which is connected to the air-duct by an inclined or arcuate section in which a control valve is located below the mechanical conveyer shaft.

A further object of this invention resides in the provision of a pneumatic conveyer apparatus including a conveying air-duct and a mechanical conveyer casing having a connection with the air duct which is inclined or substantially arcuate in shape, and which provides an expansion or storage space for the material which is separated from a chamber directly communicating with the air-duct, by a valve member.

Another object of this invention is to provide a valved connection between the mechanical conveyer casing and the conveying air-duct of an apparatus of the character described, which permits the use of an imperforate valve disposed substantially in line with the thrust of the mechanical conveyer or screw to preclude packing and insure an even uniform feed of materials into the air-duct with the least possible resistance.

And a further object of this invention resides in the provision of means for preventing the packing of material between the screw shaft and an adjacent wall of its casing, outwardly of the end of the screw.

With the above and other objects in view which will appear as the description proceeds, the invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, is illustrated two complete examples of the physical embodiment of the invention constructed according to the best modes so far devised for the practical application of the principles thereof, and in which:

Figure 1 is a side view, partly in section and partly in elevation, of a pneumatic conveying apparatus embodying this invention;

Figure 2 is a fragmentary detail view, partly in section and partly in elevation, taken through Figure 1 on the plane of the line 2—2;

Figure 3 is a view, similar to Figure 1 illustrating a slightly modified construction of this invention.

Referring now more particularly to the accompanying drawing, in which like numerals designate like parts throughout the several views, 5 designates a fan casing having an air impeller 6 therein, the shaft 7 of which is journalled in standards 8.

A conveying air-duct or trunk 9 projects tangentially from the fan casing, preferably at its lower portion, to a suitable point of discharge, not shown. This air duct has an opening 10 in its top wall through which the material to be conveyed is discharged into the duct.

However, to prevent the loss of air pressure, the material is conveyed to and discharged through the opening 10 into the duct in such a manner that the entering material serves to maintain a complete closure at all times. To this end, a mechanical conveyer casing 11 has its discharge end communicated with the opening 10 through a discharge chamber 12 and an expansion chamber 13, both of which form in effect continuations of the mechanical conveyer casing, although the casing 11 is cylindrical and the chambers 12 and 13 are square or rectangular in cross section. It is observed that the discharge chamber is inclined with respect to the air duct and that the expansion chamber is bodily directed downwardly from axial alignment with the mechanical conveyer casing toward the discharge chamber. The top and bottom walls of the downwardly directed portion of the expansion chamber may be either arcuate as shown in Figure 1 or straight as in Figure 3, but in each instance the inclined top wall extends beneath the longitudinal axis of the casing 11.

Rotatably mounted within the casing 11 is a conventional screw conveyer 14 which extends from the receiving end of the casing to the receiving end of the expansion chamber, and the shaft 15 on which it is mounted extends across the expansion chamber and through its top wall where it is journalled in a bearing 16. On the outer end of the shaft is a bevel gear 17, which meshes with a second gear 18 fixed to a counter shaft 19 journalled in suitable bearings carried by the bearing 16. A pulley 20 fixed to one end of the counter shaft and having a belt 21 trained over it and a pulley 22 on the impeller shaft 7 imparts a drive from the blower to the screw conveyer. Obviously the impeller may be driven from any suitable source, not shown, and in any desired manner.

A hopper 23 at the receiving end of the mechanical conveyer casing facilitates the feeding of material to the screw conveyer which carries or conveys the material to the expansion chamber.

As best shown in Figure 2, the side walls 24 of the expansion chamber diverge outwardly with the direction of material feed, to progressively increase the cross sectional area of the chamber and thus permit an expansion or loosening of the materials. This is very desirable especially when materials having a tendency to pack are being handled, as it facilitates the feeding of the material into the air duct and enables it to be more readily picked up by the conveying current of air.

The expansion and discharge chambers are, for all practical purposes, one continuous duct with one chamber divided from the other by a flap valve 25. The location of this valve and the manner in which it is mounted are extremely important factors in the design of the apparatus and to a large extent are responsible for its sucessful operation.

It is observed that the pivotal or hinged mounting 26 of this valve is adjacent the point of egress of the screw shaft from the expansion chamber, but beneath the shaft so that the valve normally hangs across the duct forming the expansion and discharge chambers with its side edges closely adjacent the sides of the duct and its bottom resting on the bottom of the duct. It is also noted that by mounting the valve entirely below the shaft, an imperforate solid valve is made possible so that when the valve is in its normal position it completely closes off all communication between the expansion and discharge chambers and prevents the leakage of air pressure from the conveying air duct.

To further improve the closure afforded by the valve in its normal closed position the sides of the duct forming the expansion and discharge chambers may be provided with shoulders or abutments 27 against which the side portions of the valve abut.

As the material is conveyed through the expansion chamber by the action of the screws, it lifts or opens the valve to the extent necessary to permit the material to pass. The extent of opening depends upon the quantity or volume of material supplied by the screw conveyer, and it will be readily apparent that the material passing the valve and holding it open closes the opening thus provided and prevents back pressure.

It is further observed that in both modifications shown, the valve, when closed, is substantially in line with the thrust of the conveying screw so that the valve offers the least possible resistance to the movement of the material and the load on the screw conveyer is reduced to a minimum. The particular shape of the duct forming the expansion and discharge chambers also promotes free movement of the material therethrough.

To prevent packing of the material between the screw shaft and the top wall of the expansion chamber, the screw may be continued toward the valve in tapered form as at 28 in Figure 1, or the shaft may be provided with a series of progressively shorter prongs 29 arranged helically at the end of the screw as in Figure 3. Obviously, the tapered screw portion and the prongs may be carried by a sleeve which is fixed to the shaft.

From the foregoing description taken in connection with the accompanying drawing, it will be readily apparent to those skilled in the art to which a device of the character described appertains, that I provide a pneumatic conveying apparatus in which the occurrence of back pressure in the mechanical conveyer casing is eliminated, the jamming of the material as it passes from the mechanical conveyer casing to the air duct prevented, and one which is capable of very economical and efficient operation.

What I claim as my invention is:

1. In a pneumatic conveyer apparatus for handling material having a tendency to pack, a blower fan, a conveying duct leading from the fan, a mechanical conveyer casing inclined upwardly with its receiving end lowermost and its discharge end portion directed bodily toward the conveying duct to gradually change the direction of movement of the material being conveyed through the mechanical conveyer casing, a screw in the mechanical conveyer casing for lifting material through the casing to be discharged into the conveying duct, a drive shaft for the screw having one end projecting through the outer wall of the discharge end portion of the casing, the extreme discharge end portion of the casing beyond the point of egress of the shaft being abruptly increased in width to form shoulders, a valve member positioned in said portion of increased width, and means hingedly mounting the valve member at a point adjacent the point of egress of the shaft through the inclined casing wall whereby the valve normally hangs in closed position and in the direct path of materials lifted by the screw and with its side edges engaging said shoulders.

2. In a pneumatic conveyer apparatus a blower fan, a conveying duct leading from the fan, a mechanical conveyer casing having a receiving end and a discharge end portion, the discharge end portion being connected with the conveying duct and being inclined bodily toward the conveying duct to gradually change the direction of movement of material conveyed therethrough, a screw conveyer in the mechanical conveyer casing for conveying material through the casing to be discharged into the conveying duct, a drive shaft for the screw conveyer extending through the outer wall of the bodily inclined discharge end portion of the casing, a valve member within the discharge end portion of the conveyer casing, and means hingedly mounting the valve member between the point of egress of the shaft and the conveying duct and substantially in line with the thrust of the screw conveyer to be opened by material conveyed through the mechanical conveyer casing by said screw conveyer.

3. In a pneumatic conveyer apparatus including a conveying air duct, means for discharging material to be conveyed into said air duct comprising, a mechanical conveyer casing adjacent the duct and having a receiving end and a discharge end portion, the discharge end portion being bodily inclined toward the conveying duct and communicating with the duct, a screw conveyer in the mechanical conveyer casing for conveying material through the casing to be discharged into the conveying duct, a drive shaft for the screw conveyer projecting outwardly through the outer inclined wall of the discharge end portion of the casing, drive means adjacent said discharge end of the casing for driving the shaft, an imperforate valve within the discharge end portion of the casing, and means movably mounting said valve between the point of egress of the shaft through the outer inclined wall and the conveying duct, said valve when in its normal closed position being substantially in line with the thrust of the screw conveyer to be readily opened by the material conveyed through the casing by said screw conveyer.

4. In a pneumatic conveyer apparatus including a conveying air duct and means to create a pressure current of air therein, means to feed material into said duct comprising, a mechanical conveyer casing having a receiving end and a discharge end portion, the discharge end portion being bodily inclined with respect to the longitudinal axis of the casing to communicate with the conveying air duct and having its outer inclined wall extending across said longitudinal axis of the casing, a drive shaft for the screw conveyer projecting through said outer inclined wall, said screw conveyer being adapted to carry material from the receiving end of the casing through the casing toward its discharge end, a valve normally closing the discharge end of the casing to be opened against the air pressure within the air duct by the material carried forwardly by the screw conveyer, whereby the resistance afforded by the valve causes said material to pack between the drive shaft and the outer inclined wall of the discharge end portion, and means carried by the drive shaft to wipe the adjacent portion of the inclined wall and prevent such packing of material between the drive shaft and said outer inclined wall.

5. In a pneumatic conveyer apparatus including a conveying air duct and means to create a pressure current of air therein, means to feed material into said duct comprising, a mechanical conveyer casing having a receiving end and a discharge end portion, the discharge end portion being bodily inclined with respect to the longitudinal axis of the casing to communicate with the conveying air duct and having its outer inclined wall extending across said longitudinal axis of the casing, a drive shaft for the screw conveyer projecting through said outer inclined wall, said screw conveyer being adapted to carry material from the receiving end of the casing through the casing toward its discharge end, a valve normally closing the discharge end of the casing to be opened against the air pressure within the air duct by the material carried forwardly by the screw conveyer, whereby the resistance afforded by the valve causes said material to pack between the drive shaft and the outer inclined wall of the discharge end portion, and means forming substantially a continuation of the screw conveyer and arranged to wipe the adjacent portion of the inclined outer wall of the discharge end portion to prevent such packing of material between the shaft and said outer inclined wall.

GEORGE BERNERT.